Oct. 6, 1970
F. P. GINTZ
3,532,658
PROCESS FOR THE MANUFACTURE OF STABLE AQUEOUS DISPERSIONS OF
VINYL ESTERS OF ORGANIC ACIDS AND ETHYLENE
Filed March 22, 1967
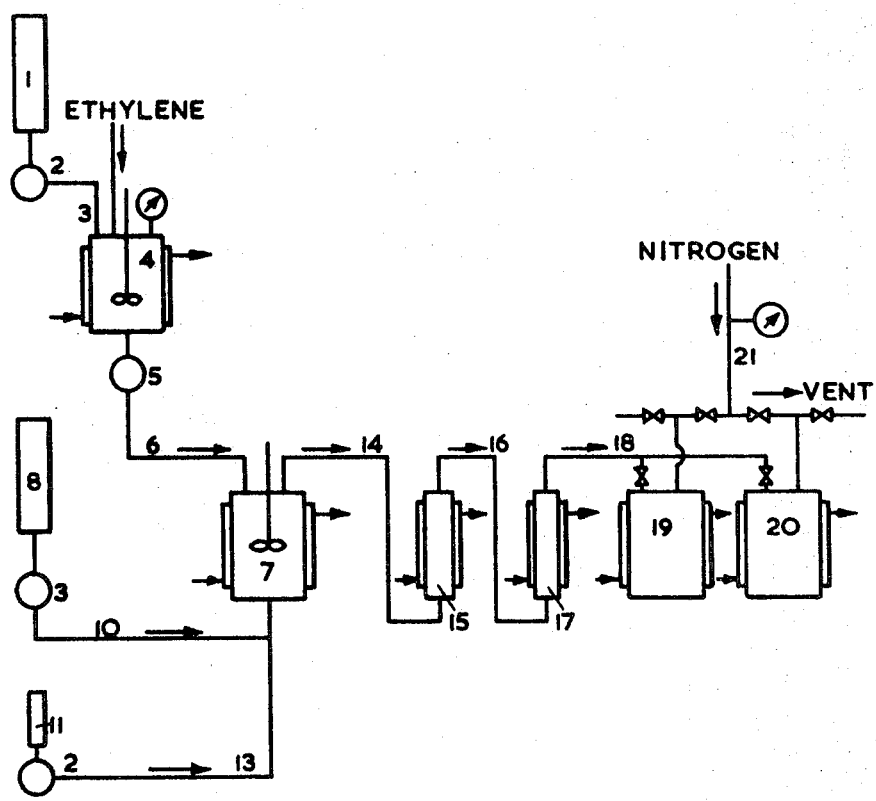
INVENTOR
FRANCIS PAUL GINTZ
BY
ATTORNEYS United States Patent Office 3,532,658
Patented Oct. 6, 1970

3,532,658
PROCESS FOR THE MANUFACTURE OF STABLE AQUEOUS DISPERSIONS OF VINYL ESTERS OF ORGANIC ACIDS AND ETHYLENE
Francis Paul Gintz, Sutton, England, assignor to BP Chemicals (U.K.) Limited, London, England, a British company
Filed Mar. 22, 1967, Ser. No. 625,065
Claims priority, application Great Britain, Apr. 20, 1966, 17,216/66
Int. Cl. C08f 15/00, 45/24
U.S. Cl. 260—29.6
9 Claims

ABSTRACT OF THE DISCLOSURE

A process for making stable aqueous dispersions of copolymers of vinyl esters of organic acids and ethylene and coating compositions based on these dispersions. The process comprises forming a solution having a predetermined concentration of ethylene in a vinyl ester of a saturated monocarboxylic acid, passing the solution to a polymerisation zone and polymerising the solution as an aqueous emulsion in the presence of a free radical catalyst, a surface active agent and/or a protective colloid whilst maintaining the zone full of liquid at sufficient pressure to retain the ethylene in solution.

The present invention is concerned with improvements in or relating to a process for the manufacture of stable aqueous dispersions of copolymers of vinyl esters of organic acids and ethylene and to coating compositions based on these dispersions.

In conventional systems for the manufacture of stable aqueous dispersions of copolymers of vinyl esters of organic acids and ethylene the polymerisation is carried out in an aqueous emulsion and the ethylene introduced by contacting the emulsion with gaseous ethylene under pressure. The concentration of ethylene in the copolymers formed varies considerably. This variation is due to such factors as the rate of uptake of ethylene on the surface of the emulsion to the volume ratio of the aqueous phase, the rate of agitation, the viscosity of the latex and other factors.

It is an object of the present invention to provide a process for the manufacture of stable aqueous dispersions of copolymers of vinyl esters of organic acids and ethylene wherein the reproducibility of the composition of the copolymer is improved.

The process for the manufactuer of a stable aqueous dispersion of a copolymer of a vinyl ester of an organic acid and ethylene according to the present invention comprises forming a solution having a predetermined concentration of ethylene in a vinyl ester of a saturated monocarboxylic acid, passing the solution to a polymerisation zone and polymerising the solution as an aqueous emulsion in the presence of a free radical catalyst, a surface active agent and/or a protective colloid whilst maintainin gthe zone full of liquid at sufficient pressure to retain the ethylene in solution.

The acid component of the vinyl ester is most suitably derived from a linear or branched aliphatic carboxylic acid containing up to 12 carbon atoms. The preferred acids contain 2–7 carbon atoms. Some examples of these vinyl esters are vinyl acetate, vinyl propionate and vinyl butyrate. Mixtures of more than one vinyl ester can be used. Minor amounts of other copolymerisable monomers may also be present, for example, acrylic, methacrylic, crotonic, maleic or fumaric acids or their esters or divinyl esters of dicarboxylic acids such as divinyl adipate. In this manner it is possible to prepare dspersions, the films from which, in comparison with polyvinyl acetate, have modified properties, for example a certain degree of flexibility, greater elongation at break and lower minimum film forming temperature.

The solution of ethylene in the vinyl ester can be prepared for example by stirring the ester at a controlled temperature under a constant ethylene pressure. Alternatively, the ester can be passed at a controlled temperautre down a packed column in which the ethylene pressure is kept constant. Examples of the type of pressures are 20 to 1000 lbs. per square inch at temperatures in the range 20° to 80° C. The solution can have any predetermined concentration of ethylene which gives a copolymer having useful film forming properties. Most suitably the concentration is in the range 1 to 50 percent by weight of ethylene in relation to the total weight of polymerisable monomers in the solution. The preferred concentration is in the range 5 to 25 percent. The solution is formed outside the polymerisation zone and is subsequently introduced to the zone, preferably as a continuous stream which can be emulsified with water either before or after introduction.

The proportion by weight of polymerisable monomers in the aqueous emulsion is preferably in the range 10 to 60 percent.

Free radical catalysts are well known and any such catalyst can be used in the present process. The catalyst can consist of a single compound or can comprise a plurality of compounds which act in combination as a system. Some examples are the azo or peroxy compounds or redox initiating systems. The catalyst can be water- or oil-soluble. Some examples are the organic or inorganic peroxides, persulphates or peroxy carbonates such as ammonium persulphate and the dialkyl percarbonates, e.g., di-isopropyl peroxy dicarbonate; azo compounds such as azo-bis-isopropyl peroxy dicarbonate; azo compounds such as azo-bis-isobutyronitrile; and redox systems such as ammonium persulphate/sodium metabisulphite, α-cumene hydroperoxide/ferrous iron complex, benzoyl peroxide/ferrous iron complex, an alkali metal chlorate/alkali metal sulphite and boron alkyl/oxygen.

A chain transfer agent may be present; suitable agents are the long chain water insoluble aliphatic mercaptans such as n- or tertiary dodecyl mercaptan.

The surface active agent can be selected from any of the known commercial ionic or nonionic surface active products which can be used either singly or as mixtures. Some examples of ionic surface active agents are the anionic agents such as the alkali metal salts of alkaryl sulphonic acids (e.g., sodium dodecyl diphenyl ether disulphonate), alkali metal salts of long chain fatty acid sulphates (e.g., sodium lauryl sulphate) and esters of sodium sulphosuccinic acid (e.g., sodium dioctyl sulphosuccinate). Examples of nonionic agents are ethylene oxide/nonyl phenol condensates, and long chain fatty acid mono esters of polyhydroxy alcohols (e.g., sorbitol mono-oleate).

The use of protective colloids in aqueous free radical polymerisation systems is well known and any such colloid can be used in the process of the present invention. Some examples are polyvinyl alcohols and water soluble cellulose derivatives, for example cellulose ethers, such as ethyl cellulose. Alternatively, or in addition, stabilising comonomers such as vinyl sulphonic acid may be employed.

The components of the reaction mixture are preferably added continuously to the polymerisation zone.

The polymerisation temperature is normally in the range 20° C. to 100° C. and preferably in the range 50° C. to 80 C.

The pH of the emulsion should be maintained within the range 4 to 7.5 so as to prevent hydrolysis of the vinyl ester. A suitable buffering agent such as potassium or sodium bicarbonate can be added for this purpose.

The pressure required to retain the ethylene in solution is greater than the vapour pressure of the aqueous emulsion in the polymerisation zone. This vapour pressure will depend principally on the ratio of ethylene to vinyl ester in the solution and to a lesser extent on such factors as the temperature of polymerisation and the percentage conversion of monomer to polymer. For convenience of operation the pressure should be maintained at a minimum of about 25 lbs. per square inch above the vapour pressure of the emulsion. Considerably higher pressures can be used with suitable equipment but this is both unnecessarily complex and costly.

The polymerisation zone must be full of liquid so as to prevent the formation of a space into which ethylene gas can escape from the solution. This condition is readily fulfilled where the process is operated continuously and solutions or emulsions are continuously fed to the zone. It can present difficulty in batch operation, since the volume of the aqueous emulsion decreases during polymerisation and further liquid must be added to compensate for this shrinkage.

Where the process is operated in the preferred manner by continuous addition of the monomer solution containing ethylene and of the aqueous phase to the zone and continuous removal of the aqueous dispersion of copolymer from the zone, the chosen mean residence time of dispersion in the zone depends on such factors as the relative proportions of monomers, their nature, the amount of free radical catalyst, the temperature of polymerisation and the desired solids content of the dispersion of copolymer.

The polymerisation zone is most suitably defined by a continuous reactor system. Such systems include stirred single or multiple series reactors or pipe loop reactors alone, in combination with each other or with unstirred reactors and/or displacement pipes. Preferably, the system can comprise a first vessel which may be a stirred kettle of conventional design or a pipe loop reactor and one or more vessels in series with the first vessel. When this preferred system is used the greater part of the monomers are polymerised in the first vessel and as high a proportion as possible of the remaining monomers polymerised in each successive vessel. The temperature of these successive vessels may be higher than in the first vessel and additional catalyst can be added as a separate stream if desired.

The dispersion of copolymer can be recovered from the zone, for example, in one of two or more receivers which are maintained under an inert gas pressure. These receivers can be used alternately to collect the dispersion. When one receiver is full it can be depressurised and the dispersion recovered. If the dispersion contains unpolymerised monomer, this can be removed by blowing air or nitrogen through it or passing it through a stripping column. Alternatively, the dispersion may be discharged through a let-down valve which ensures that a sufficiently high pressure to prevent the formation of a gas phase is maintained in the reaction zone.

Stable aqueous dispersions of copolymers having a solids content greater than 30 percent can be obtained from the process by suitably adjusting the proportions of monomer and water and the polymerisation conditions.

The aqueous dispersions can be used as a basis for coating compositions which on evaporation give rise to flexible films. The presence of as little as 5 percent by weight of polymerised ethylene in the copolymer is sufficient to give improved flexibility.

In addition the dispersions can be used to formulate adhesive compositions.

Since the proportion of monomers in the monomer solution can be kept constant, the process according to the present invention can be readily controlled and in consequence stable aqueous dispersions of copolymer of reproducible composition can be formed.

An embodiment of the process according to the present invention is now described with reference to the following example.

EXAMPLE 1

The accampanying drawing illustrates the apparatus in which the process can be carried out. In the drawing 1, 8 and 11 represent calibrated storage vessels in which vinyl acetate, aqueous phase and catalyst activator respectively are prepared and/or stored prior to use. 4 is a mixing vessel provided with a stirrer wherein an ethylene/vinyl acetate solution having a predetermined concentration of ethylene can be formed prior to passing the solution to a polymerisation zone. This zone is represented by jacketed reactor vessels 7, 15 and 17. The jackets provide means by which the temperature within each vessel can be controlled in a range 30° C. to 95° C. Vessel 7 in addition is provided with a stirrer. Reactor vessel 17 is connected to let-down vessels 19 and 20 wherein the product can be collected and stored under pressure of nitrogen from line 21. Pumps 5, 9 and 12 are provided whereby the reactants can be pumped under pressure to the first reactor vessel 7. Pump 2 is used to pump vinyl acetate from its storage vessel 1 to mixing vessel 4.

In operation of the process a saturated solution of ethylene in vinyl acetate at a pressure of 200 lbs. per square inch and a temperature of 25° C. is prepared in vessel 4.

An equeous phase comprising the following components was charged to vessel 8.

| | Grams |
|---|---|
| Sodium decyl benzene sulphonate | 11.2 |
| Nonyl phentol-ethylene oxide condensates | 60.0 |
| Polyvinyl alcohol | 3.8 |
| Potassium bicarbonate | 6.0 |
| Water | 1470 |
| Ammonium persulphate | 10.0 |
| Formic acid to pH 7.0. | |

A catalyst activator consisting of sodium metabisulphite 10 grams and water 300 grams was charged to vessel 11.

These starting materials were pumped to reactor vessel 7 at the following rates, ethylene/vinyl acetate solution 263 mls. per hour, catalyst activator 50 mls. per hour and aqueous phase 238 mls. per hour. The pressure in reactor 7 was maintained at 400 lbs. per square inch and its temperature at 64° C. The proportion of aqueous phase to ethylene/vinyl acetate solution was maintained constant at 288/263 parts by volume. The reactants were formed into an aqueous emulsion in this vessel by the action of the stirrer. The partially polymerised latex was displaced after a mean residence time of 3.1 hours in this vessel into reactor vessel 15 and maintained at 60° C. for a mean residence time of 1.9 hours when the latex was further displaced into reactor vessel 17 and maintained at 70° C. for a mean residence time of 1.9 hours. Steady reaction conditions were obtained after 16 hours operation of the apparatus. The pH varied through the system starting at 7 and ending at 5. The latex finally produced in vessel 17 was then passed into either letdown vessel 19 or 20 where it was stored under a nitrogen pressure of 400 lbs. per square inch. This pressure was sufficiently high to prevent the formation of a separate gas phase in reactors 7, 15 or 17. When either let-down vessel was filled to about three quarters of its volume the latex was fed to the other vessels whilst the first vessel was vented off and discharged.

The latex thus obtained had a pH of 5.0 and a free monomer content calculated as vinyl acetate of 0.6 percent.

Films cast from this aqueous dispersion of coplymer had an ethylene content of 8.5 percent by weight and a vinyl acetate content of 86.5 percent by weight as determined by nuclear magnetic resonance. The nuclear magnetic resonance method is well known. The balance between the ethylene and vinyl acetate and 100 percent was made up by surfactants.

These stable aqueous dispersions of copolymer have a more reproducible composition than aqueous dispersions of a similar type of copolymer prepared by the batch processes hitherto known.

EXAMPLE 2

A continuous polymerisation was carried out using the same apparatus and procedures as those in Example 1 but with the following feeds.

(A) A saturated solution of ethylene in vinyl acetate at a pressure of 250 lbs. per square inch and a temperature of 25° C. The solution contained 1 percent by weight on vinyl acetate of a nonyl phenol ethylene oxide condensate.

(B) An aqueous phase comprising: Grams
Nonyl phenol ethylene oxide condensate ____ 30
Potassium bicarbonate _____ 6
Water _____ 1484
Ammonium persulphate _____ 10
Formic acid to pH 7.0.

(C) Catalyst activator comprising:
Sodium metabisulphite _____ 10
Water _____ 300

These starting materials were pumped to reactor vessel 7 at the following rates, ethylene/vinyl acetate solution 453 mls. per hour, aqueous phase 492 mls. per hour and catalyst 90 mls. per hour.

The pressure in reactor 7 was maintained at 400 lbs. per square inch and its temperature at 68° C. The proportion of aqueous phase to ethylene/vinyl acetate solution was maintained constant at 492/453 parts by volume. The reactants were formed into an aqueous emulsion in this vessel by the action of the stirrer. The partially polymerised latex was displaced from vessel 7 into reactor vessel 15 and maintained at 60° C. when the latex was further displaced into vessel 17 and maintained at 70° C. The total mean residence time for polymerisation was 4 hours. Steady reaction conditions were obtained after 10 hours of operation of the apparatus. The pH varied through the system starting at 7 and ending at 5. The latex are then passed into either let-down vessel 19 or 20 where it was stored under a nitrogen pressure of 400 lbs. per square inch. This pressure was sufficient to prevent the formation of a separate gas phase in reactors 7, 15 or 17. When either let-down vessel was filled to about three quarters of its volume the latex was fed to the other vessel whilst the first vessel was vented off and discharged.

Samples of the copolymers thus formed were taken after 10, 14, 18 and 22 hours from the start of polymerisation. The mean ethylene content was 12.9 percent by weight and the individual contents varied from 12.5 to 14 percent, the figures having an accuracy of ±1 percent.

By way of comparison a batch polymerisation was carried out using a recipe calculated to give copolymers having a similar composition to those produced by the foregoing continuous process.

This recipe is as follows—
Aqeous phase: Grams
Nonyl phenol ethylene oxide condensate __ 15
Potassium bicarbonate _____ 3
Formic acid to pH 7.0.
Catalyst:
Ammonium persulphate _____ 5
Water _____ 25
Sodium metabisulphite _____ 5
Catalyst activator:
Water _____ 140
Vinyl acetate containing 1 percent by weight of a nonyl phenol ethylene oxide condensate __ 750
Ethylene.

The aqueous phase and 10 percent of the vinyl acetate were placed in a stirred pressure reactor which was purged with nitrogen and then ethylene. The catalyst solution was added, the reaction heated to 60° C. and pressurised to 400 lbs. per square inch with ethylene. After half an hour the metabisulphite solution was added and addition of the remaining vinyl acetate commenced. Vinyl acetate addition was completed after 4 hours but metabisulphite solution continued throughout the remainder of the reaction period which totalled 6 hours. The charge was cooled to 20° C. and unreacted ethylene vented off.

The run was then repeated 8 times to give 9 batches of copolymers, each batch obtained from a separate run.

The copolymers obtained from these 9 runs had a mean ethylene content of 18 percent and individual ethylene contents varied from 14 to 25 percent ±1 percent.

The results illustrate that copolymers formed according to the continuous process of the present invention have a more reproducible composition than those produced by a conventional batch process.

I claim:
1. A process for the manufacture of a stable aqueous dispersion of a copolymer of at least one vinyl ester of a linear or branched organic acid containing up to 12 carbon atoms and a low ethylene content of from 5–25 percent ethylene wherein the proportion of the monomers in the copolymer is reproducible, which comprises forming a solution having a predetermined concentration of ethylene in a vinyl ester of a saturated monocarboxylic acid at a low ethylene pressure of less than 1000 p.s.i., passing the solution to a polymerization zone and polymerizing the solution as an aqueous emulsion in the presence of a free radical catalyst while maintaining the zone full of liquid at sufficient pressure to prevent the escape of ethylene and the formation of a gas phase and to retain the ethylene in solution.

2. A process as claimed in claim 1 wherein the proportion by weight of polymerizable monomers in the aqueous emulsion is in the range 10 to 60 percent.

3. A process as claimed in claim 1 wherein the zone is maintained at a pressure of at least 25 lbs. per square inch above the vapor pressure of the emulsion.

4. A process as claimed in claim 1 wherein the vinyl ester of said saturated monocarboxylic acid is vinyl acetate.

5. The process according to claim 1 wherein said solution of predetermined concentration of ethylene in said vinyl ester is continuously introduced into the said polymerization zone.

6. The process according to claim 1 wherein said solution of predetermined concentration of ethylene in said vinyl ester additionally contains at least one surface-active agent which is an ionic or nonionic surface-active agent.

7. The process according to claim 1 wherein said solution of predetermined concentration of ethylene in said vinyl ester additionally contains a protective colloid.

8. The process according to claim 1 wherein said solution of predetermined concentration of ethylene in said vinyl ester contains at least one surface-active agent and a protective colloid.

9. A process for the manufacture of a stable aqueous dispersion of a copolymer of vinyl acetate and a low content of ethylene which comprises forming a solution of ethylene is vinyl acetate at a low ethylene pressure of less than 1000 p.s.i. having a predetermined concentration in the range 5–25 percent by weight of ethylene in relation to the total weight of the solution, passing the solution to a polymerization zone and polymerizing the solution as an aqueous emulsion in the presence of a free radical catalyst, while maintaining the zone full of liquid at a pressure of at least 25 lbs. per square inch above the vapor pressure of the emulsion and sufficient to prevent the formation of a gas phase and to retain the ethylene in solution whereby the concentration of ethylene in the copolymer is reproducible.

References Cited

UNITED STATES PATENTS 3,296,170    1/1967    Burkhart et al.

MURRAY TILLMAN, Primary Examiner

H. ROBERTS, Assistant Examiner

U.S. Cl. X.R.

260—34.2, 80.8, 80.81, 87.3